Oct. 20, 1931.  A. J. FAUSEK ET AL  1,828,135
TORCH
Filed June 5, 1929   2 Sheets-Sheet 2
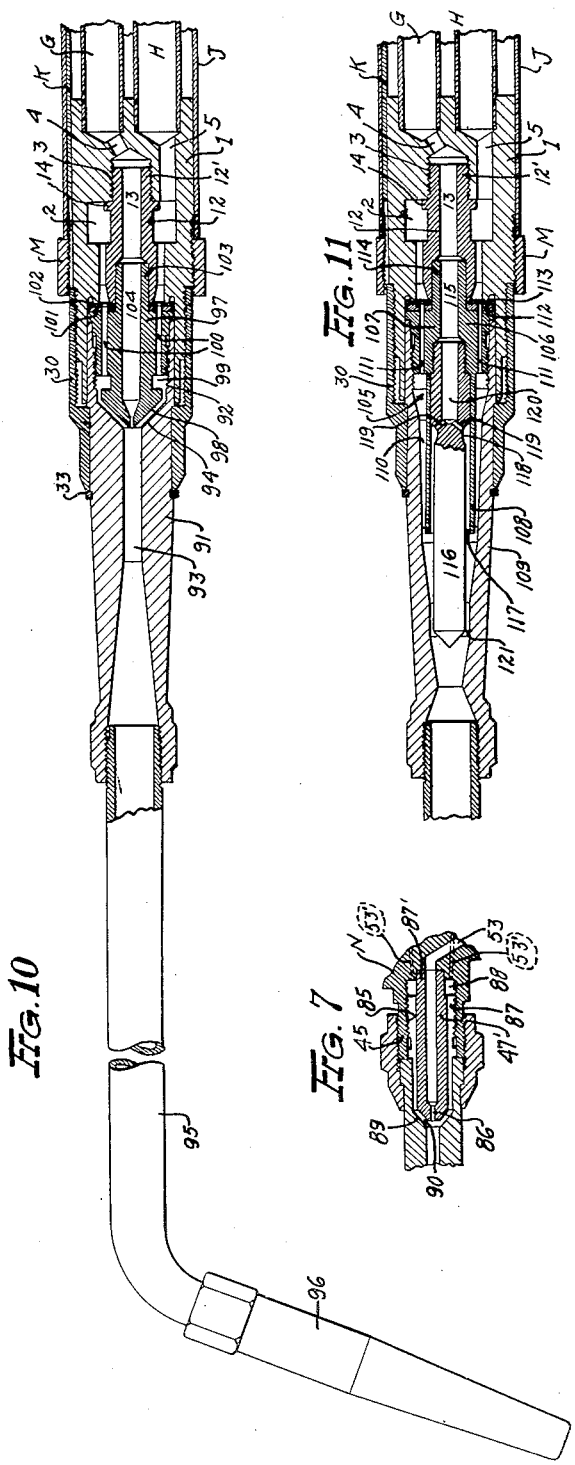
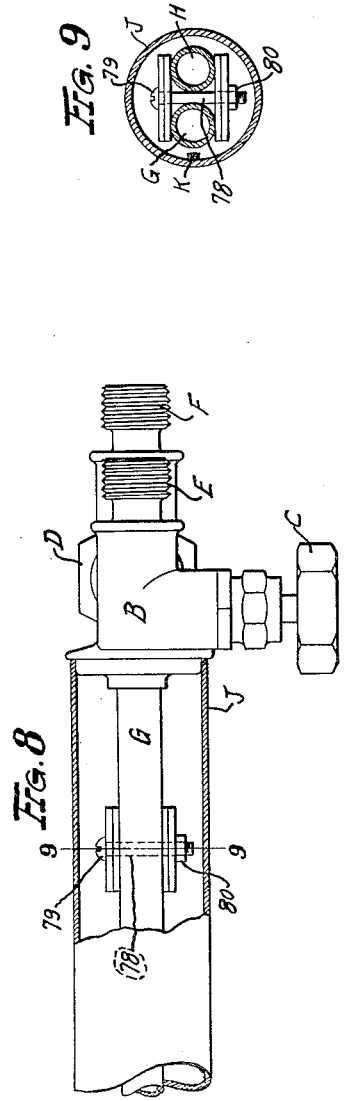
INVENTORS
A. J. FAUSEK
I. F. FAUSEK
BY *E. W. Harrington*
ATTORNEY Patented Oct. 20, 1931

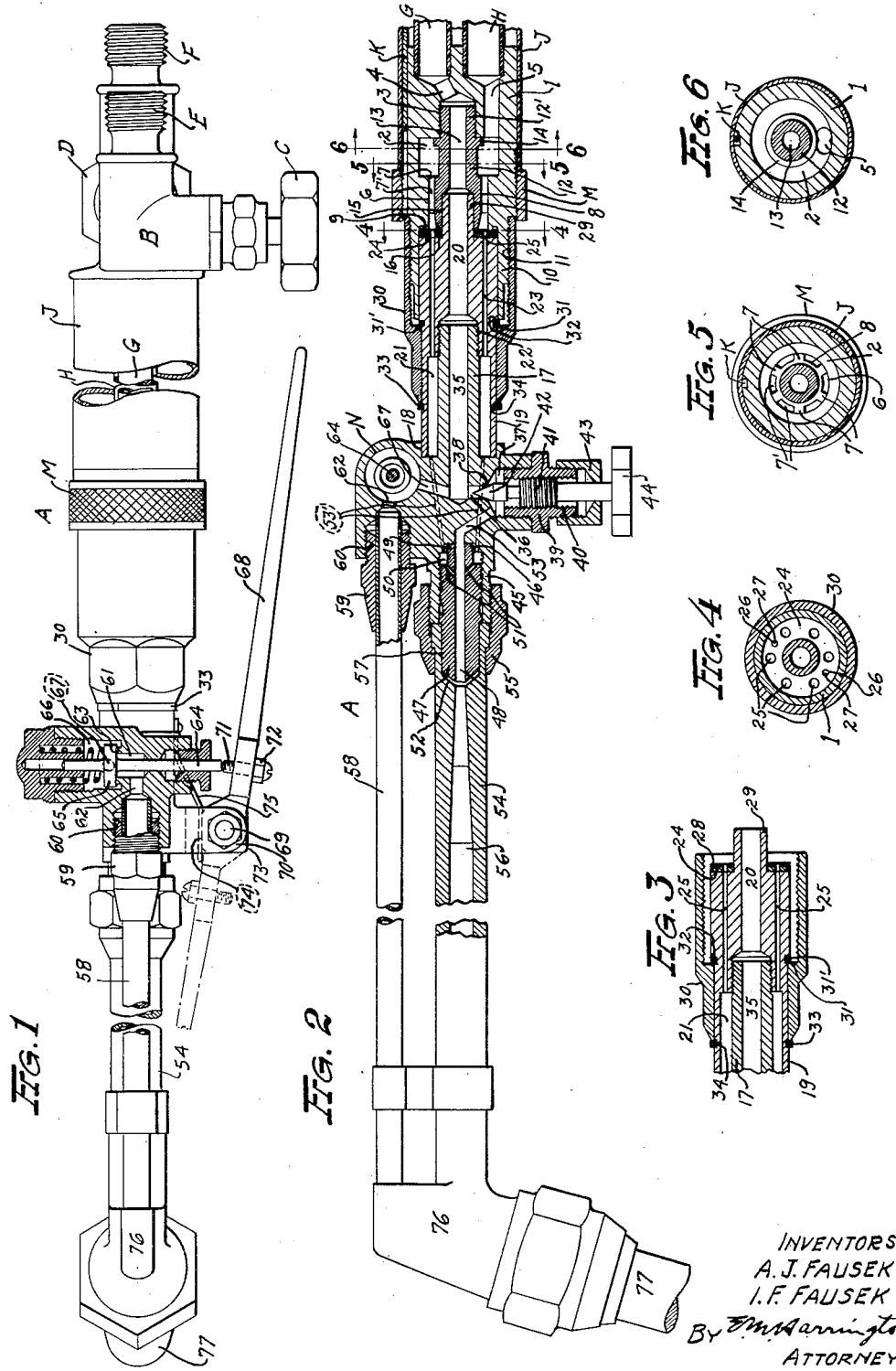

1,828,135

UNITED STATES PATENT OFFICE

ARTHUR J. FAUSEK AND IRWING F. FAUSEK, OF ST. LOUIS, MISSOURI

TORCH

Application filed June 5, 1929. Serial No. 368,476.

This invention relates generally to torches of the type employed for utilizing oxygen, acetylene and other gases as a medium for cutting and welding metals, and more specifically to improved apparatus of this type which is so constructed as to be capable of being assembled to provide cutting or welding torches adapted for use with gases at low or medium pressures.

It is well known to persons familiar with the art to which this invention belongs, that gases at low or medium pressures are employed in performing metal cutting and welding operations with torches of the type disclosed herein and that the torches adapted for use with low pressure gases are of different construction from those adapted for use with medium pressure gases. It is likewise common knowledge to such persons that torches employed in metal cutting operations are of different construction from torches employed in performing welding operations. In many instances, prior to this invention, entirely separate torches were provided for cutting and welding operations and also the torches provided for use with gases of low pressure were entirely independent of the torches provided for use with gases of medium pressure.

In view of the foregoing we have devised the improved torch disclosed herein which includes a handle structure with which attachments may be associated to provide $a$, a low pressure cutting torch, $b$, a medium pressure cutting torch, $c$, a low pressure welding torch and $d$, a medium pressure welding torch. By this arrangement the user of our improved torches need not be supplied with separate torches for cutting and welding with gases at low and medium pressures, but need be supplied with only one complete torch and with the attachments necessary to convert said torch into forms adapted to different uses and for use with gases of different pressures.

The invention also includes a number of important details of construction which serve to provide a torch of increased efficiency and adaptability and these details of construction will be hereinafter described and set forth in the claims.

Figure 1 is a plan view of the improved torch, a portion thereof being shown in section and portions being broken away to conserve space.

Figure 2 is a view of the torch shown in Figure 1 illustrating same partly in side elevation and partly in section.

Figure 3 is a fragmentary section showing the arrangement for protecting the gasket of the torch from injury.

Figure 4 is a cross section on line 4—4 of Figure 2.

Figure 5 is a cross section on line 5—5 of Figure 2.

Figure 6 is a cross section on line 6—6 of Figure 2.

Figure 7 is an enlarged section of the mixer for the low pressure cutting torch.

Figure 8 is a section of the handle portion of the torch and illustrating the manner in which spare gaskets are kept within said handle portion.

Figure 9 is a cross section on line 9—9 of Figure 7.

Figure 10 is a fragmentary view illustrating the manner in which the necessary attachments are associated with the handle portion of the torch to provide a low pressure welding torch.

Figure 11 is a view similar to Figure 10 but illustrating the assembly providing the medium pressure welding torch.

In the drawings, wherein is shown for the purpose of illustration merely one embodiment of the invention, and referring particularly to Figures 1 and 2, A designates our improved torch when same is in the form of a medium pressure cutting torch. The torch A comprises a tail piece B of usual construction, said tail piece being provided with valves C and D by means of which gases which pass through passageways formed in the tail piece may be regulated and controlled. The tail piece is provided with threaded nipples E and F adapted to receive conductors (not shown) whereby the passageways formed in the tail piece may be placed in communication with the source of supply of the gases. Connected to the tail piece B so as to be in communication with the gas passageways formed therein is a pair of tubes G and H, said tubes, at the ends opposite to the ends thereof which are connected to the tail piece being connected to a handle head 1 as shown clearly in Figure 2. Surrounding the tubes G and H is a sleeve J which serves as the handle of the torch, said sleeve being provided with a key K extended longitudinally thereof which enters notches formed in the tail piece B and handle head 1 respectively. M designates an internally screw-threaded ring which is screwed on a screw-threaded portion of the handle head 1 as shown in Figure 2 in a manner to abut against the forward end of the sleeve J. It is plain, in view of the construction of the handle portion of the torch as just described, that when the ring M is unscrewed from the screw-threaded portion of the handle head 1 and moved forwardly of the torch the sleeve J may likewise be moved forwardly of the torch to expose the tubes G and H within said sleeve J. It is likewise obvious that when the handle portion of the torch is detached from the forward portions of the torch the sleeve J may be entirely removed from the handle portion of the torch in the manner described.

As already stated the tubes G and H are connected to the handle head 1, said tubes being seated in recesses formed in said handle head as shown in Figure 2 and said tubes being brazed or otherwise rigidly secured to said handle head. Formed in the approximate center of the handle head 1 is a space 2 which communicates with a screwthreaded opening 3. The screwthreaded opening 3 is in turn placed in communication with the tube G by a passageway 4, and the tube H in like manner is placed in communication with the space 2 by a passageway 5. The passageway 5 is elongated in cross-section as shown in Figure 6 so as to provide a passageway of ample area for the gas passing therethrough, said passageway being formed by drilling two holes side by side in overlapping relation with respect to each other.

Forwardly of the space 2, the handle head is provided with a centrally disposed opening 6, and forwardly of the opening 6 the handle head 1 is provided with an annular raised seat 9, said seat 9 being located at the inner end of a tubular portion 10 of the handle head extended longitudinally of the torch and forwardly from the main body portion of the handle head 1. The tubular portion is provided with external screwthreads 11 for a portion of its length as shown in Figure 2.

12 designates a member (Figure 2) which is disposed within the handle head 1, said member having a screwthreaded end portion 12' which is screwed into the threaded opening 3 within the handle head. The member 12 is provided with a passageway 13 extended longitudinally therethrough and said member is provided with a flange 14 adapted to contact with a wall of the space 2 whereby the movement of the member rearwardly of the handle head is limited. At its forward end the member 12 is of enlarged diameter and the passageway 13 through said member is likewise enlarged within the enlarged end portion of the member as indicated at the point designated by the reference character 15. The enlarged end portion of the member 12 is provided with a plurality of outwardly extended radial ribs 7 (Figure 5), said ribs being of such length and disposition that the outer ends thereof contact with the wall of the opening 6. The spaces 7' between the ribs 7 are constituted gas passageways the inner and outer walls of which are the wall of the opening 6 within the handle head 1 and the outer surface of the enlarged portion of the member 12 respectively. The forward end of the member 12 tapers slightly as shown in Figure 2 and the extreme outer edge of said tapered portion provides a seat 16 which is alined transversely of the torch with the seat 9 already referred to.

N designates the valve body of the torch A, said valve body comprising a body portion from which a tubular stem 17 extends rearwardly of the torch. The tubular stem 17 is externally screwthreaded at its outer end and at the base of said stem the body portion of the valve body is provided with a recess 18. 19 designates a union sleeve an end portion of which is seated in the recess 18 wherein said end portion of the union sleeve is brazed or otherwise rigidly fixed to the valve body N. The rear portion of the union sleeve 19 is provided with a wall of substantially greater thickness than the forward portion of said union sleeve and as the excess thickness of said wall portion extends inwardly a passageway 20 is provided through the rear portion of the union sleeve which is of substantially less diameter than the opening 21 formed in the forward portion of the union sleeve. At the forward end of the passageway 20 in the union sleeve 19, an enlarged screwthreaded opening 22 is provided into which the screwthreaded rearward end of the stem 17 extends, and extended through the thickened wall portion of said union sleeve 19 is a plurality of gas passageways 23 which place the opening 21 within the forward portion of the union sleeve in communication with the gas passageways 7' between the ribs 7 within the handle head 1.

Located in contact with the rear face of the union sleeve 19 is a gasket 24, said gasket being provided with a plurality of apertures 25 so arranged, that they register with the adjacent ends of the gas passageways 23. The gasket 24 is provided also with one or more smaller apertures 26 into which a pin or pins 27 projecting from the union sleeve extend. By causing the pins 27 to extend into the apertures 26, proper registration of the apertures 25 in the gasket with the adjacent ends of the passageways 23 is assured. As shown in Figure 3 the gasket 24 which is formed of suitable material is provided with an enclosing shell 28, said shell preferably being formed of suitable soft metal and being provided with apertures corresponding to and registering with the apertures 25 and 26 formed through said gasket. The shell 28 fits closely about the gasket 24 and serves to protect said gasket from injury.

Extended rearwardly from the rear face of the union sleeve 19 is an extension 29 which projects into the opening 15 at the forward end of the member 12. The extension 29 and the opening 15 are of such relative diameters that close contact is obtained between the outer face of the extension and the wall of the opening and the gasket 24 and the shell 28 associated therewith are provided with central openings through which the extension 29 projects.

For the purpose of connecting the union sleeve 19 to the handle head 1, we employ a nut 30 (Figure 2). This nut encircles the union sleeve and is rotatably mounted thereon and the rear portion of said nut is provided with internal screwthreads which are adapted to engage screwthreads 11 formed on the handle head 1. The nut 30 is provided with an internal annular shoulder 31 between which shoulder 31 and an annular shoulder 32 on the union sleeve 19, an anti-friction ring 31′ is positioned and in view of this arrangement rotation of the nut about the union sleeve when the screwthreads of the nut are in engagement with the screwthreads 11 on the handle head 1 will cause the tubular portion 10 of the handle head to be drawn into the interior of the nut with the result that eventually the seats 9 and 16 will be drawn into close contact with the shell 28 of the gasket 24, whereby a fluid-tight seal between the handle head and the union sleeve will be obtained.

The nut 30 is so positioned on the union sleeve that its rearward end portion encircles and extends outwardly beyond the gasket 24. This is important in that when the handle portion of the torch is disengaged from the forward portion thereof, the nut serves to prevent injury to the gasket which might result from rough handling of the forward portion of the torch. With the nut encircling and extending beyond the gasket as described and as shown clearly in Figure 3 the gasket is positively protected from injury. To prevent the nut 30 being moved forwardly of the union sleeve so as to expose the gasket to injury, we employ a split ring 33 which is seated in an annular groove 34. The split ring does not prevent rotation of the nut 30, but it does prevent movement thereof longitudinally of the union sleeve 19 in a direction toward the forward end of the torch, which movement of the nut would cause the gasket to be exposed beyond the end of the nut.

The passageway 35 formed through the stem 17 communicates with the passageway 20 extended through the union sleeve 19 and said passageway 35 extends into the interior of the valve body N. Communicating with and extending from the passageway 35 is a port 36 (Figure 2) which leads from said passageway 35 to a valve chamber 37. The valve chamber 37 is provided with a valve seat 38, and 39 designates a member which screws into said valve chamber, said member being provided with a screwthreaded opening 40 formed therethrough. 41 designates a valve member which is mounted for rotary and longitudinal movement within the member 39, said valve member having a valve head 42 arranged for movement with respect to the valve seat 38. The valve of which the valve member 41 is a part includes a packing gland 43 for rendering the valve fluid-tight, and a valve operating element 44 for adjusting the valve head relative to the valve seat.

The valve body N includes a hollow extension 45 which is internally and externally screwthreaded, and at the inner end of the hollow interior of said extension, the valve body is provided a recess 46. Screwed into the hollow extension 45 is a mixer 47 which comprises an elongated member having a passageway 48 formed therethrough from end to end thereof. The mixer 47 is provided with external screwthreads adapted to engage the screwthreads within the extension 45 and said mixer at one of its ends is provided with a portion 49 of reduced diameter. The portion 49 extends into the recess 46 already referred to as shown in Figure 2 and said portion is of such length that when it is so seated in the recess the inner wall of the mixer is spaced apart from the inner wall of the opening within the extension 45 to provide an annular space 50 which surrounds the portion 49. The mixer 47 is provided with a plurality of angularly disposed passageways 51 which place the annular space 50 in communication with the passageway 48 formed through the mixer, and at the end thereof opposite to the end at which the portion 49 is located the mixer is tapered as indicated at 52. 53 designates a gas passageway which extends from the valve chamber 37 to the adjacent end of the passageway 48 formed through the mixer 47. Extended from an end of the space 21 within the union sleeve to the annular space 50 is a plurality of gas passageways 53′.

54 designates a gas conductor which extends forwardly of the torch and is connected by means of a nut 55 to the hollow extension 45 already referred to. The conductor 54 is, of course, provided with a passageway 56 formed longitudinally therethrough and at the rearmost end of said conductor the passageway is increased in diameter to provide a recess 57 into which the forward portion of the mixer 47 extends. At the forward end of the recess 57 same is provided with an inclined wall with respect to which the tapered forward end of the mixer is positioned.

Disposed above the gas conductor 54 is a second gas conductor 58 which is connected to the valve body N by a coupling 59, said coupling being screwed into a screwthreaded recess 60 formed in said valve body. The hollow interior of the conductor 58 is placed in communication with a valve chamber 61 through the instrumentality of a gas passageway 62. The valve chamber 61 is open at one end thereof and at said open end of said chamber a valve seat 63 is arranged. 64 designates a spring pressed valve stem which is mounted for movement within the valve body N, said valve stem having a valve head 65 associated therewith and said valve head being movable toward and away from the valve seat 63 when the valve stem is subjected to longitudinal movement. Located at the opposite side of the valve seat 63 with respect to the valve chamber 61 is a larger valve chamber 66 which is separated from the valve chamber 61 by the valve head 65 when said valve head is in engagement with the valve seat 63. The valve chamber 66 is placed in communication with the passageway 35 within the valve body N by a port 67.

In view of the arrangement of the gas passageways and valve chambers as just described, it is plain that when the valve head 65 is unseated gas will pass from the passageway 35 through the port 67 to the valve chamber 66, and said gas will flow around the unseated valve head into the valve chamber 61, whence said gas will flow through the passageway 62 and conductor 58.

For the purpose of causing movement to be imparted to the valve stem 64, we provide a handle 68, pivoted at 69 to ears 70 extended from the valve body N. The handle 68 is provided with screwthreaded aperture formed therethrough through which a screw 71 extends. The screw 71 contacts with an end of the valve stem 64 and said screw is adjustable longitudinally of itself to compensate for wearing of the valve head and valve seat, said screw being provided with a lock nut 72 which provides means for maintaining the screw in position to which same has been adjusted.

When the handle portion of the torch is disengaged from the forward portion thereof, the handle 68, when same is in the position in which it is illustrated in Figure 1, extends beyond the rearmost end of said forward torch portion. This is undesirable and we have, therefore, provided means for moving the handle about its pivot so as to cause said handle to assume the position in which same is shown by dotted lines in Figure 1. To permit such pivotal movement of the handle, we provide said handle with a pair of diametrically opposed flat faces 73 and 74 and employ a leaf spring 75 which is screwed at one of its ends to the valve body N and at its opposite end contacts with one or the other of the flat faces 73 and 74. When the handle is is in the position in which same is shown in Figure 1, that is with the free end of the leaf spring 75 in contact with the flat face 74 of said handle, the handle will be maintained in such position by the pressure exerted against the face 74 thereof by the leaf spring 75, and as the handle is moved to actuate the valve stem 64 the leaf spring will yield to permit such movement. However, when it is desired to move the handle to the inoperative position in which same is shown by dotted lines in Figure 1, said handle is moved about its pivot until the flat face 73 contacts with the free end of the leaf spring, whereupon, the pressure exerted against said face 73 by the leaf spring will maintain the handle in its inoperative position.

Located at the forward ends of the conductors 54 and 58 is the head 76 of the torch to which head said conductors lead in the usual manner and 77 designates a nozzle of ordinary construction which is connected to the head 76 in the usual manner.

The gaskets 24 and gasket shells 28 employed in the use of our improved torch in time become worn and we, therefore, provide convenient means for maintaining spare gaskets and shells on hand. This arrangement involves arranging a number of gaskets and shells at opposite sides of the tubes G and H within the handle portion of the torch and passing a bolt 78 through the openings at the centers of said gaskets and shells and between said tubes as shown in Figure 9. The bolt 78 has a head 79 at one end thereof and a nut 80 at its opposite end, and by these elements the gaskets and shells are maintained in position with respect to the tubes G and H. Access may be had to the spare gaskets and shells by unscrewing the ring M and moving the sleeve J forwardly of the torch to expose the spare parts.

The torch thus far described is a medium pressure cutting torch and in the use thereof gas, oxygen for instance, passing through the tube G will pass through the passageways 4, 13, 20, 35 and 67 to the valve chamber 66 and from said passageway 35 to the port 36. In like manner gas, acetylene for instance, passing through the tube H will flow through the passageway 5 into the passageways 7' between 2 and through the passageways 7' between the radial ribs 7, and passageways 23 into the space 21 within the union sleeve 19. From the space 21 the gas will flow through the passageways 53' to the annular space 50 at the inner end of the mixer 47 and said gas will flow from the space 50 through the passageways 51 to the passageway through the mixer. With the valve head 42 removed from its seat some of the oxygen will pass through the passageway 36 and into the valve chamber 37 whence said oxygen will flow through the passageway 53 to the interior of the mixer 47. It is obvious, therefore, that the acetylene passing into the passageway 48 of the mixer through the passageways 51 will be mixed with the oxygen passing into said passageway 48 through the passageway 53 whereby a combustible mixture is produced which passes through the conductor 54 to the nozzle 77 of the torch. It is apparent that the volume of oxygen passing into the mixer may be regulated by adjustment of the valve head 42.

As already stated some of the oxygen passes into the valve chamber 66 and the flow of this oxygen through the conductor 58 to the nozzle 77 of the torch may be controlled and regulated by manipulation of the valve head 65 with the aid of the handle 68.

When it is desired to convert the torch illustrated in Figures 1 and 2 into a low pressure cutting torch, it is necessary to merely disconnect the conductors 54 and 58 from the valve body N and substitute for the mixer 47 illustrated in Figure 2 the mixer 47' shown in Figure 7. The mixer 47', like the mixer 47 is provided with external screwthreads 85 which are adapted to engage the screwthreads within the hollow extension 45 of the valve body N. The gas passageway through the mixer 47' is reduced in diameter at the forward end of the mixer as indicated by the reference character 86; and at its outer surface said mixer 47' is provided with circumferentially spaced grooves 87 which extend longitudially of the mixer from end to end thereof. The mixer 47' is provided with an extension 87' similar to the extension 49 on the mixer 47 and this extension causes the inner wall of the mixer 47' to be spaced apart from the inner wall of the hollow interior of the extension 45 to provide an annular space 88 into which the gas passageways 53' lead. Also the tapered forward end of the mixer 47' is spaced apart from the correspondingly tapered face 89 within the conductor 54 to provide an annular tapered passageway 90 which communicates with the grooves 87 and with the passageway 56 formed through the conductor 54.

In the use of a torch having one of the low pressure mixers 47' associated therewith, oxygen passing through the restricted portion 86 of the passageway formed through the mixer will be discharged forcibly into the passageway 56 in the conductor 54 whereby the discharge end of the mixer will be constituted an ejector. The result of this ejector action of the mixer is that the acetylene will be drawn through the grooves 87 and space 90 to the discharge end of the passageway 86 where complete admixture of the acetylene and oxygen will take place.

When it is desired to convert the torch disclosed in the present application from the cutting torch illustrated in Figures 1 and 2 to a low pressure welding torch, the nut 30 is unscrewed from the handle head 1 and the forward portion of the torch which includes the valve body and the union sleeve is disengaged from the handle portion by withdrawing the union sleeve from the tubular portion 10 of the handle head and extension 29 of said union sleeve from the recess 15 in said handle head.

The elements of which the forward portion of the welding torch is comprised include a mixer shell 91 having a screwthreaded recess 92 as its rearmost end. The mixer shell is provided with a passageway 93 formed longitudinally therethrough and the forward end of the recess 92 in said mixer shell is provided with a tapered wall 94. Screwed into the mixer shell at the forward end thereof is a tube 95 with which is associated in the usual manner a nozzle 96. Screwed into the recess 92 in the mixer shell 91 is a mixer 97, said mixer comprising a member having a head portion having a tapered face 98 which is arranged in spaced relation with respect to the tapered wall 94 within the recess 92. The mixer is also provided with an annular groove 99 and with a plurality of gas passageways 100 which extend longitudinally through the mixer from the annular groove 99 to the rear end thereof. The mixer 97 is provided with a gasket 101 and gasket shell 102 similar to the gasket 24 and gasket shell 28 already described and said gasket 101 and shell 102 are provided with apertures which coincide with the gas passageways 100. Also at the rear end of the mixer same is provided with an extension 103 similar to the extension 29 on the union sleeve of the cutting torch. The mixer is provided with a gas passageway 104 formed longitudinally therethrough and this passageway is of reduced diameter at the forward end of the mixer.

When the low pressure welding assembly is to be associated with the handle portion of the torch, the rear end portion of the mixer shell with the mixer in place in the recess 92 thereof will be introduced into the tubular forward portion of the union sleeve 19, as shown in Figure 10 so the extension 103 of said mixer will be disposed within the recess 15 of the member 12 of the handle head 1. The nut 30 will then be screwed on the externally threaded portion of the handle head, whereby the gasket and gasket shell associated with the mixer will be drawn into close contact with the seats 9 and 16 within the handle head.

In the use of the welding torch illustrated in Figure 10, oxygen flowing through the central passageway 104 formed through the mixer will be ejected forcibly from the restricted forward end thereof and because of the ejector action of the mixer, acetylene will be drawn through the passageways 100 and through the space between the faces 94 and 98 to the discharge end of the mixer where said oxygen and acetylene will be thoroughly mixed.

When a medium pressure welding torch is to be associated with the handle portion of a torch, the forward welding assembly will include a mixer 105 which is substituted for the low pressure mixer 97 already described. The mixer 105 includes a mixer body 106 having a rear portion 107 provided with external screwthreads and a forward tubular portion 108. The rear portion 107 of the medium pressure mixer is screwed into the mixer shell 109 and the outer face of the tubular portion 108 is spaced apart from the inner face of the mixer shell to provide an annular space 110. Gas passageways 111 are formed through the rear portion of mixer 105, said passageways communicating at the forward ends with the space 110 and at their rear ends with apertures formed through the gasket 112 and gasket shell 113 arranged at the rear end of the mixer body. The mixer body is provided with an extension 114 which extends into the recess 15 formed in the member 12 of the handle head 1, and the rear portion of the mixer body is provided with a centrally disposed gas passageway 115, the forward end of which is of enlarged diameter and is screwthreaded. 116 designates a mixer stem the rearmost end portion of which is screwed into the screwthreaded forward portion of the gas passageway 115. The forward portion of the mixer stem is of slightly less diameter than the rear portion thereof, hence, while the rear portion of the mixer stem entirely fills the tubular portion 108 of the mixer body cross-sectionally a space 117 is provided between the outer face of the forward portion of the mixer stem and the inner face of the tubular portion of the mixer body. The mixer stem is provided with an annular groove 118 to which diagonal ports 119 formed in said stem lead, said diagonal ports also being in communication with a gas passageway 120 formed centrally within the mixer stem.

In assembling the medium pressure welding torch the mixer shell is introduced into the tubular portion of the union sleeve of the handle portion of the torch, and the extension 114 is extended into the recess 15 of the member 12. The nut 30 is then screwed on the union sleeve whereby the gasket 112 and gasket shell 113 are drawn into close contact with the seats 9 and 16. With the parts of the torch assembled as described oxygen will pass through the passageways 115, 120, 119 to the annular groove 118, and through the space 117 to the space within the mixer shell 109. Also the acetylene will pass through the passageways 111 into the space 110 and through said space to the discharge end of the mixer body where said acetylene will be thoroughly mixed with the oxygen as said gases pass through the restricted space 121 at the forward end of the mixer stem 116.

It will be noted that the cutting torches and the welding torches each includes an element provided with an extension which is extended into the recess 15 in the member 12 within the handle head and these extensions serve to protect the gaskets in that they act as centering elements which cause the gaskets to be moved into their proper positions with the seats 9 and 16. Also the extensions referred to prevent any lateral movement of the gaskets with respect to the seats 9 and 16 and they provide contracting surfaces of increased length which reduce the likelihood of gas leaking past said contacting surfaces.

We claim:

1. In an apparatus of the class described, a handle portion, and a plurality of interchangeable parts adapted for attachment to said handle portion to provide torches having different characteristics, a joint element associated with each of said interchangeable parts, and a pair of extensions of different diameters on said element arranged to extend into recesses in said handle portion at the joint between said interchangeable part and said handle portion.

2. In an apparatus of the class described, a handle portion, and a plurality of interchangeable parts adapted for attachment to said handle portion to provide torches having different characteristics, a joint element associated with each of said interchangeable parts, a pair of extensions of different diameters on said element arranged to extend into recesses in said handle portion at the joint between said interchangeable part and said handle portion, and a gasket positioned adjacent to one of said extensions and arranged for interposition between the interchangeable part and said handle portion.

3. In an apparatus of the class described, a handle portion, and a plurality of interchangeable parts adapted for attachment to said handle portion to provide torches having different characteristics, an element associated with each of said interchangeable parts provided with gas passageways formed therethrough, a pair of extensions on said element arranged to extend into recesses in said handle portion at the joint between said interchangeable part and said handle portion, and a gasket positioned adjacent to one of said extensions and arranged for interposition between said interchangeable part and said handle portion, said gasket being provided with apertures formed therethrough and arranged coincident with said gas passageways in said joint element.

4. In an apparatus of the class described, a handle portion, and a plurality of interchangeable parts adapted for attachment to said handle portion to provide torches having different characteristics, an element associated with each of said interchangeable parts provided with gas passageways formed therethrough, a pair of extensions on said element arranged to extend into recesses in said handle portion at the joint between said interchangeable part and said handle portion, a gasket positioned adjacent to one of said extensions and arranged for interposition between said interchangeable part and said handle portion, said gasket being provided with apertures formed therethrough and arranged coincident with said gas passageways in said joint element, and means for causing registration of the apertures in said gasket with the gas passageways in said joint element, said means comprising a pin extended from said joint element, and said gasket being provided with an aperture into which said pin projects.

5. In an apparatus of the class described, a handle portion and a plurality of interchangeable parts adapted for attachment to said handle portion to provide torches having different characteristics, an element removably associated with each of said interchangeable parts, and a cylindrical extension on said element of reduced diameter with respect thereto and arranged to extend into a recess in said handle portion at the joint between said interchangeable part and said handle portion.

6. In an apparatus of the class described, a handle portion, and a plurality of interchangeable parts adapted for attachment to said handle portion to provide torches having different characteristics, a joint element associated with each of said interchangeable parts, an extension on said element arranged to extend into a recess in said handle portion at the joint between said interchangeable part and said handle portion, a gasket positioned adjacent to said extension and arranged for interposition between the interchangeable part and said handle portion, and an enclosing shell of soft material for said gasket.

7. A torch including a handle portion, a torch portion detachably secured to said handle portion, a gasket interposed at the joint between said torch portion and said handle portion, a nut for connecting the torch portion to the handle portion, said nut being rotatably mounted on said torch portion in a manner to surround and overlap said gasket when the torch portion is disengaged from the handle portion, whereby same is protected from injury, and means including a split ring for preventing longitudinal movement of said nut with respect to said torch portion.

8. A torch including a handle portion, a torch portion detachably secured to said handle portion, a gasket interposed at the joint between said torch portion and said handle portion, a nut rotatably mounted on said torch portion for connecting the torch portion to the handle portion, an abutment for preventing movement of the nut in one direction longitudinally of its axis, and a second abutment for preventing movement of the nut in the opposite direction longitudinally of its axis, one of said abutments being in the form of a removable split ring and said gasket being disposed within said nut when said torch portion is disengaged from said handle portion whereby same is protected from injury.

9. A torch including a handle portion, a torch portion detachably secured to said handle portion, a gasket interposed at the joint between said torch portion and said handle portion, a nut rotatably mounted on said torch portion for connecting the torch portion to the handle portion, an abutment for preventing movement of the nut in one direction longitudinally of its axis, and a second abutment for preventing movement of the nut in the opposite direction longitudinally of its axis, the last mentioned abutment comprising an annular member seated in a groove in said torch portion, said gasket being disposed within said nut when said torch portion is disengaged from said handle portion whereby same is protected from injury.

10. A torch including a handle portion, a torch portion detachably secured to said handle portion, a gasket interposed at the joint between said torch portion and said handle portion, a nut rotatably mounted on said torch portion for connecting the torch portion to the handle portion, an abutment for preventing movement of the nut in one direction longitudinally of its axis, and a second abutment for preventing movement of the nut in the opposite direction longitudinally of its axis, the last mentioned abutment comprising a split ring seated in a groove in said torch portion, said gasket being disposed within said nut when said torch portion is disengaged from said handle portion whereby same is protected from injury.

11. A torch comprising a valve body, a valve member arranged within said valve body, a pivoted handle for operating said valve member, and means for maintaining said handle in a plurality of positions, said means comprising a plurality of faces on said handle, and resilient means arranged to impart pressure against said handle at one or another of said faces.

12. A torch comprising a valve body, a valve member arranged within said valve body, a pivoted handle for operating said valve member, and means for maintaining said handle in a plurality of positions, said means comprising a plurality of flat faces on said handle, and a leaf spring arranged to impart pressure against the handle at one or another of said flat faces.

13. A torch including a handle portion, a torch portion detachably secured to said handle portion, a nut for connecting the torch portion to the handle portion, said nut being rotatably mounted on said torch portion, an annular abutment on said torch portion, and a split ring associated with said torch portion and disposed in spaced relation with respect to said abutment, said nut being provided with an annular portion which is interposed between said abutment and said split ring whereby undue movement of the nut longitudinally of said torch portion is prevented.

In testimony whereof, we have hereunto set our hands.

ARTHUR J. FAUSEK.
IRWING F. FAUSEK.